G. M. LUDLOW.
DISPENSING APPARATUS.
APPLICATION FILED JAN. 2, 1912.

1,193,704.

Patented Aug. 8, 1916.
2 SHEETS—SHEET 1.

Witnesses:
John Enders
Henry A. Parks

Inventor:
George M. Ludlow,
by Sheridan, Wilkinson, Scott & Richmond,
Attys.

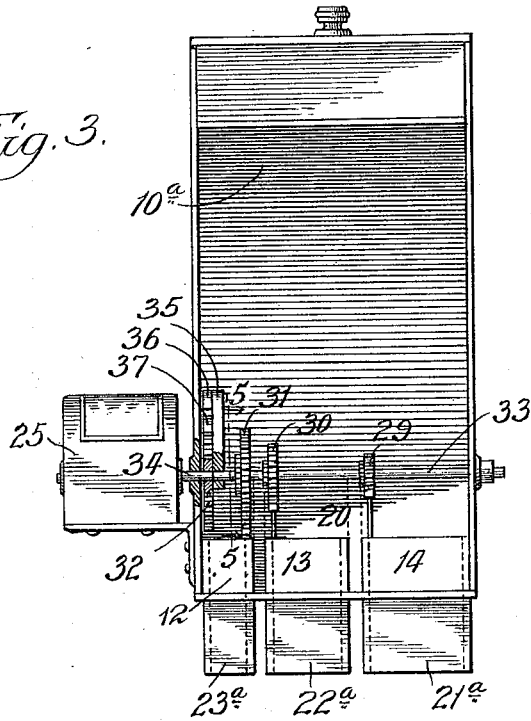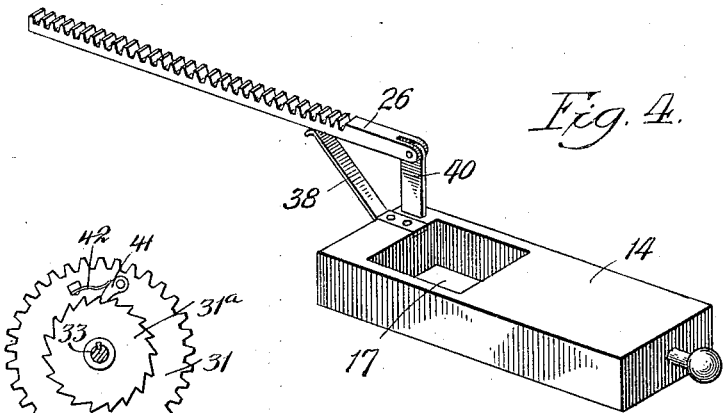

UNITED STATES PATENT OFFICE.

GEORGE M. LUDLOW, OF CHICAGO, ILLINOIS, ASSIGNOR TO THE COMPUTING SCALE COMPANY, OF DAYTON, OHIO, A CORPORATION OF OHIO.

DISPENSING APPARATUS.

1,193,704.   Specification of Letters Patent.   Patented Aug. 8, 1916.

Application filed January 2, 1912. Serial No. 668,966.

*To all whom it may concern:*

Be it known that I, GEORGE M. LUDLOW, a citizen of the United States, residing at Chicago, in the county of Cook and State of Illinois, have invented certain new and useful Improvements in Dispensing Apparatus, of which the following is a specification.

The object of my invention is to provide a mechanism for dispensing various quantities of materials by volumetric measurements.

A further object is to provide a counting and indicating mechanism which will accurately show the quantities dispensed, even though these quantities may vary.

Such articles as coffee, sugar, &c., may be measured volumetrically and the quantities so measured may be so proportioned as to accurately represent various desired weights of said articles.

In carrying out my invention I have provided certain movable slides having receiving and measuring cavities, the volumes of said cavities respectively representing various weights of the material to be dispensed. These slides may be moved to positions from which the material may be discharged into sacks or other receptacles. The movement of the slides is utilized for actuating the counting and indicating mechanism.

Other objects and advantages of my invention will be made apparent in the following specification and claims when taken in connection with the accompanying drawings, in which—

Figure 1:
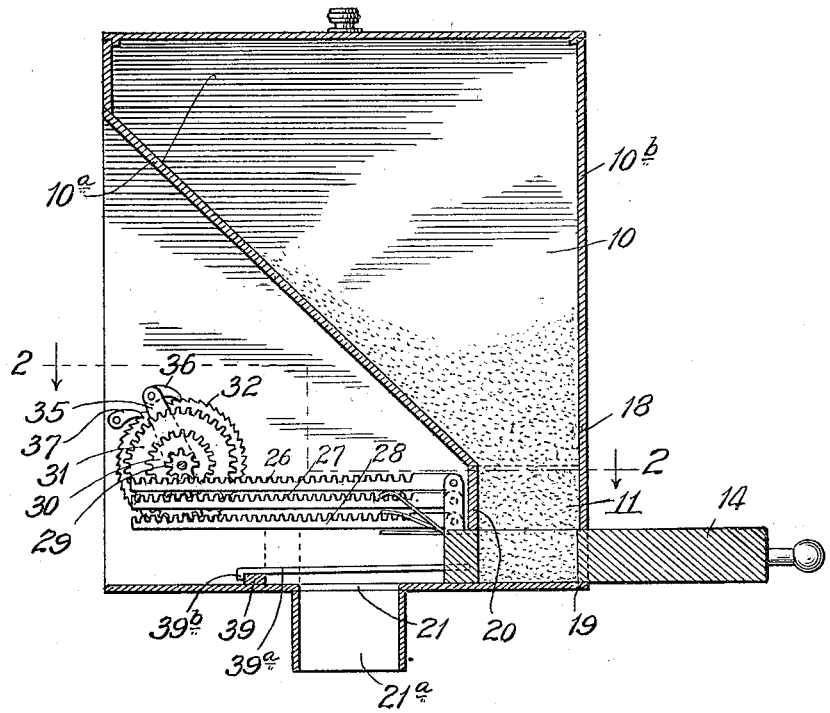
Figure 2:
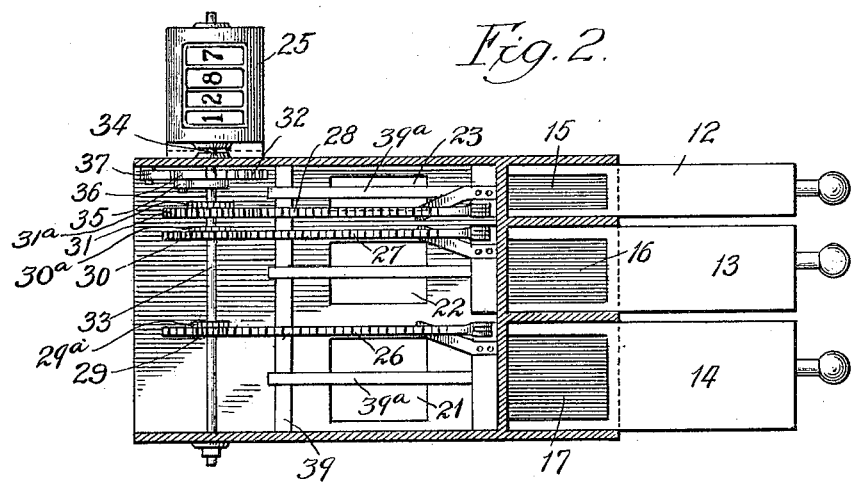

Figure 1 is a vertical section of the apparatus; Fig. 2 is a horizontal section taken on the line 2—2 of Fig. 1; Fig. 3 is a rear elevation of the apparatus; Fig. 4 is a perspective view of one of the measuring slides with the indicator actuating rack attached; and Fig. 5 is an enlarged sectional view taken on the line 5—5 of Fig. 3, looking in the direction of the arrows.

I accomplish the object of my invention by providing a bin 10 having an inclined wall 10$^a$ and a vertical wall 10$^b$ which converge at their lower portions into vertical chutes 11 leading to the measuring slides. The bin will therefore be seen to have the general form of a hopper.

The chutes 11 have positions directly above the slides 12, 13 and 14, in which are cavities or open spaces 15, 16, and 17, respectively. Directly below the slides is the lower wall 19 of the apparatus which serves as a closure for the cavities in the slides at their bottoms while they are in their respective receiving positions. The slides are shown in their receiving positions in the drawings.

While the slides are in their receiving positions the cavities 15, 16, and 17 will be entirely filled by the material flowing into them from the bin. The slides when thus filled are ready to be moved into their discharging positions over apertures 21, 22, and 23 in the lower wall of the apparatus. While they are being moved backwardly to this position the rear wall 20 of the chutes 11 serves to prevent any of the material in the chutes being carried along with the slides. Said wall 20 will therefore be seen to accurately limit the quantity of material in the slides by scraping along its upper surface.

The slides 12, 13, and 14 have different sizes and the cavities therein are of such capacity as will measure out quantities representing different weights of the material. For instance, the cavity 17 may measure out a volume of sugar which will weigh one pound; the cavity 16 will measure out a quantity which will weigh half a pound; and the cavity 15 will measure a quantity which will weigh a quarter of a pound. Various other sizes and proportions can of course be provided to suit different materials and conditions.

The apertures 21, 22, and 23 may open into chutes 21$^a$, 22$^a$, and 23$^a$ of suitable form and proportions for discharging the material into paper bags or other receptacles. The stop 39 may limit the stroke of the slides and openings in their rearward direction, and any suitable device, such as a rod 39$^a$ having a hook 39$^b$ at its end may permit said stop to limit the stroke in a forward direction. The rod 39$^a$ may be attached to the slide in any suitable manner.

I have provided a counting and indicating mechanism 25 for showing the total quantity of material dispensed at any time. This counting mechanism is actuated by mechanism comprising racks 26, 27, and 28, which mesh with gear wheels 29, 30, and 31 rotatably mounted on a shaft 33. This shaft is suitably mounted in bearings in the walls of the mechanism and carries an arm 35 having a pawl 36 at its end which engages and actuates a ratchet wheel 32. This ratchet wheel is fixed to the shaft 34 of the counting and indicating mechanism. A detent 37 prevents a reverse rotation of the ratchet wheel.

Ratchet wheels 29$^a$, 30$^a$ and 31$^a$ are fixed on the shaft 33 adjacent the gear wheels 29, 30 and 31, respectively, and each of said gear wheels has a pawl 41 pivoted thereon to engage the adjacent ratchet wheel whereby when one of said gear wheels is driven by the corresponding rack, the shaft 33 will rotate and drive the counting mechanism, while the other two gear wheels will be held stationary by the racks in engagement therewith, and the pawls carried by said other two gear wheels will ride freely on the rotating ratchet wheels with which they are adapted to engage. A leaf spring 42 is fixed on each gear wheel to cause the corresponding pawl normally to engage the adjacent ratchet wheel. The gear wheels are preferably arranged to mesh with the racks in such manner as to locate the pawls 41 above the shaft 33 when the gear wheels are not in operation. Fig. 5 shows a side elevation of the ratchet wheel 31$^a$, together with the pawl 41 and spring 42 carried by the adjacent gear wheel 31. It will be understood that the ratchet wheels 29$^a$ and 30$^a$ are similar to the ratchet wheel 31$^a$, although of different sizes.

The gear wheels 29, 30 and 31 have different sizes inversely corresponding to the different capacities of the apertures in the slides. It will therefore be seen that the slide which measures the larger quantity will actuate the indicating mechanism in a correspondingly greater degree.

The rack bars 26 are preferably pivoted to vertical posts 40 fixed to the slides, and are held in mesh with the gear wheels by springs 38. Because of the different sizes of the gear wheels the racks will necessarily have positions of different heights above the slides, and the post 40 will therefore have different lengths.

In using my improved dispensing device it will be seen that the operator merely has to push the particular slide inwardly, which will measure the quantity of material desired, while at the same time he holds a paper bag or other receptacle below the corresponding chute 21$^a$, 22$^a$, &c. The particular gear on the shaft 33 which is associated with said slide will be actuated and the counting mechanism will be operated to the corresponding extent. The said slide of course will have to be pulled forwardly again before it can be used to measure out another quantity.

By means of my improved dispensing apparatus it will be seen that the necessity of weighing the material is eliminated and that the time required by said weighing is saved. It will further be seen that the quantity as measured is fixed and invariable and that inaccuracies in weighing are prevented.

The counting and indicating mechanism 25 may be of any suitable construction, the details of which do not form a part of my present invention. I have therefore not illustrated the details of its construction.

While I have described my invention with more or less minuteness and as being embodied in certain precise forms, it will be understood that I do not limit myself thereto unduly or any more than is pointed out in the claims. On the contrary, I contemplate all proper changes in form, construction, and proportion of parts, the omission of elements, and the substitution of equivalents, as circumstances may suggest or necessity render expedient.

It will be seen that the apparatus I have described constitutes one specific embodiment of an invention having for its object to register accurately the successive quantities of material taken from a storage bin, thus enabling a proprietor to keep track of the total quantity withdrawn from the bin and to note whether the aggregate withdrawal from the bin when it is emptied agrees with the quantity introduced at the outset.

I claim:

1. In a device of the class described, a storage bin having an outlet opening at its base, a measuring slide adjacent thereto, a register, a shaft for actuating said register, a gear operatively connected to said shaft, and a rack actuated by said slide and yieldably engaging said gear.

2. In a device of the class described, a storage bin having an outlet opening at its base, a plurality of measuring slides of different capacity adjacent thereto, a register, a rotatable shaft to actuate the register, a plurality of gears operatively connected to said shaft, and racks actuated by said slides yieldably and permanently engaging said gears, said gears having their pitch circle diameters inversely proportional to the capacities of the respective slides.

3. In a device of the class described, a storage bin having an outlet opening at its base, a displaceable measuring element adjacent thereto, a register, a rotatable shaft to actuate the register, a gear operatively connected to said shaft, and a rack actuated by said element yieldably and permanently engaging said gear.

4. In a device of the class described, a storage bin having an outlet opening at its base, displaceable measuring means adjacent thereto, a register, a rotatable shaft to actuate the register, ratchet mechanism between said shaft and register, and rack and gear connection from said displaceable measuring means to said shaft, whereby the register will be actuated proportionally to the quantity of material measured.

In testimony whereof, I have subscribed my name.

GEORGE M. LUDLOW.

Witnesses:
HENRY A. PARKS,
EDYTHE M. ANDERSON.